United States Patent
Hellgren et al.

(10) Patent No.: US 8,483,163 B2
(45) Date of Patent: Jul. 9, 2013

(54) METHOD OF LOCATING NAS CONTEXT

(75) Inventors: Vesa Pauli Hellgren, Helsinki (FI); Serafim Petsis, Attikis (GR)

(73) Assignee: Nokia Siemens Networks Oy, Espoo (FI)

( * ) Notice: Subject to any disclaimer, the term of this patent is extended or adjusted under 35 U.S.C. 154(b) by 320 days.

(21) Appl. No.: 12/995,335

(22) PCT Filed: May 19, 2009

(86) PCT No.: PCT/EP2009/056056
§ 371 (c)(1),
(2), (4) Date: Feb. 22, 2011

(87) PCT Pub. No.: WO2009/144156
PCT Pub. Date: Dec. 3, 2009

(65) Prior Publication Data
US 2011/0167161 A1   Jul. 7, 2011

(30) Foreign Application Priority Data
May 30, 2008   (EP) .................................... 08104190

(51) Int. Cl.
*H04W 4/00* (2009.01)
*H04B 7/212* (2006.01)
*G06F 15/16* (2006.01)

(52) U.S. Cl.
USPC ............ 370/329; 370/341; 370/431; 709/227

(58) Field of Classification Search
USPC .................... 370/252, 329, 314, 431; 710/44; 709/223–230
See application file for complete search history.

(56) References Cited

U.S. PATENT DOCUMENTS

| 7,490,152 | B2 | 2/2009 | Lauer |
| 8,054,747 | B1* | 11/2011 | Lewis et al. ................... 370/232 |
| 8,312,530 | B2* | 11/2012 | Thai et al. ....................... 726/12 |
| 2002/0112054 | A1* | 8/2002 | Hatanaka ..................... 709/225 |
| 2002/0116126 | A1* | 8/2002 | Lin ............................... 701/214 |
| 2004/0215794 | A1 | 10/2004 | Lauer |

(Continued)

FOREIGN PATENT DOCUMENTS

| EP | 1071256 A1 | 1/2001 |
| WO | 2005066737 A1 | 7/2005 |

OTHER PUBLICATIONS

International Search Report of PCT/EP2009/056056, Dated Nov. 3, 2009.

(Continued)

*Primary Examiner* — Afsar M Qureshi
(74) *Attorney, Agent, or Firm* — Laurence A. Greenberg; Werner H. Stemer; Ralph E. Locher

(57) ABSTRACT

A method of locating NAS context relating to a network access server session in a communication network is provided, the method comprising receiving an Accounting Stop Request for a PDP context associated to a network access server session, comparing an Accounting Session ID implemented in the Accounting Stop Request with Accounting Session IDs associated with active network access server sessions, in case that no matching Accounting Session ID is found, determining whether a value of an identification parameter implemented in the received Accounting Stop Request matches a value of a corresponding identification parameter associated with an active network access server session, and locating a NAS context based on the result of matching identification parameters.

12 Claims, 2 Drawing Sheets

U.S. PATENT DOCUMENTS

2006/0189298 A1* 8/2006 Marcelli ................ 455/411
2007/0192846 A1* 8/2007 Thai et al. ................ 726/12
2007/0283141 A1* 12/2007 Pollutro et al. ............ 713/155

OTHER PUBLICATIONS

Lis, Digital cellular telecommunications system (Phase 2+); Universal Mobile Telecommunications System (UMTS); Interworking between the Public Land Mobile Network (PLMN) supporting packet based services and Packet Data Networks (PDN) (3GPP TS 29.061 version 7.7.0 Release 7); ETSI TS 129 061, ETSI Standards, Apr. 1, 2008, Cedex, France.

Chiba, et al., Dynamic Authorization Extension to Remote Authentication Dial in User Service (RADIUS); IETF Standard, Internet Engineering Task Force, IETF, CH, 1, Jan. 2008.

Juniper Networks Steel-Belted Radius, "Mobile IP Module Administration Guide"; Release 5.3, Jul. 2006, Sunnyvale, California, USA.

3GPP TS 23.203 V7.6.0 (Mar. 2008) 3rd Generation Partnership Project; Technical Specification Group Services and System Aspects; Policy and charging control architecture (Release 7).

3GPP TS 23.125 V7.0.0 (Jun. 2007); 3rd Generation Partnership Project; Technical Specification Group Services and System Aspects; Overall high level functionality and architecture impacts of flow based charging; Stage 2 (Release 7).

* cited by examiner

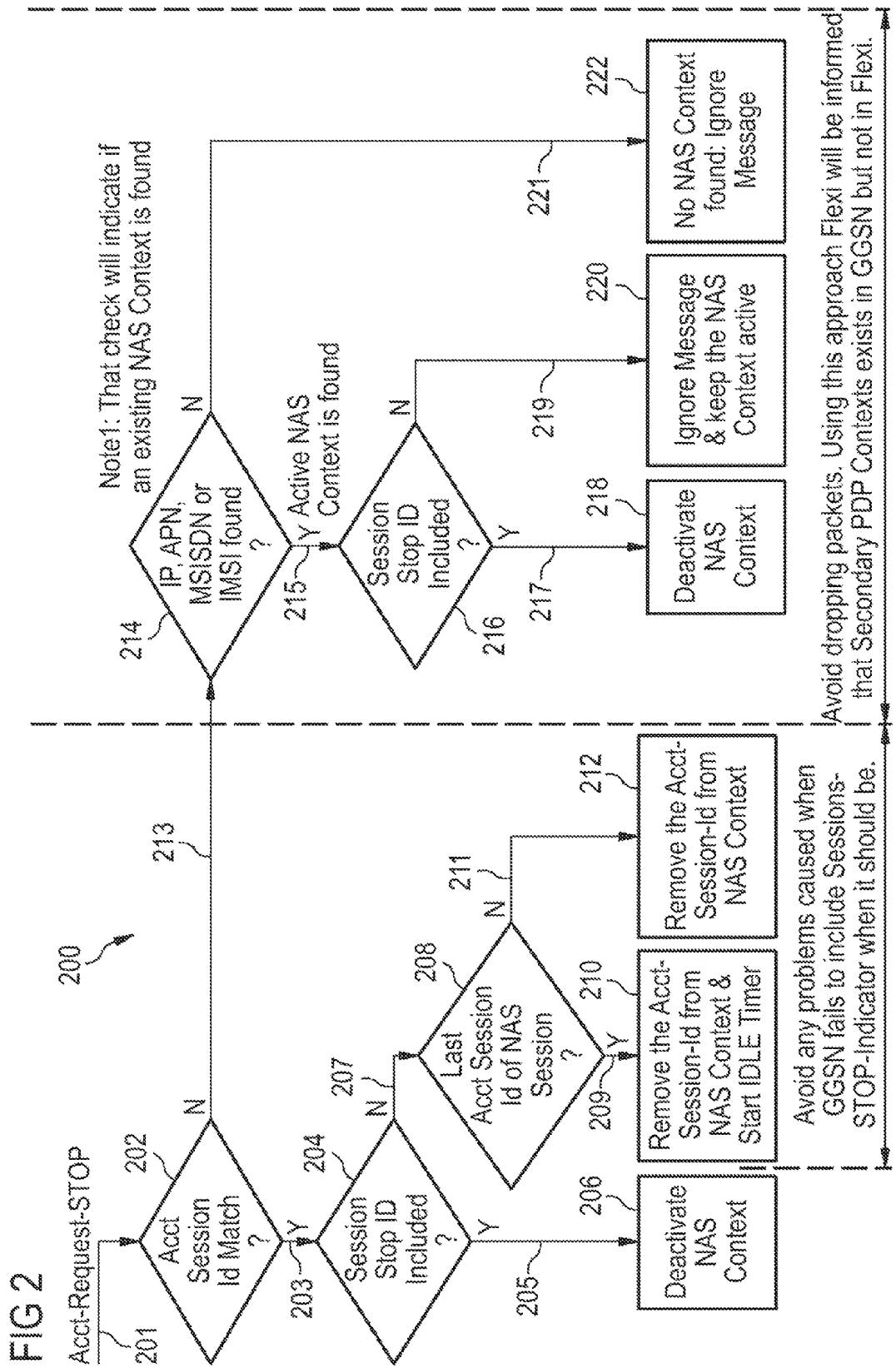

METHOD OF LOCATING NAS CONTEXT

FIELD OF INVENTION

The present invention relates to a method of locating NAS context, in particular to a method of locating NAS context based on an Accounting-Request Stop message without using an Accounting Session ID. Furthermore, the invention relates to a program element, and a computer-readable medium.

ART BACKGROUND

In a Public Land Mobile Network (PLMN), a Service Aware (SA) node such as the so-called Flexi ISN can be deployed behind a Gateway GPRS Support Node (GGSN), corresponding to a so-called Gi-deployment, to enable operators to offer services in a more flexible and efficient way. The communication between GGSN and SA node is performed through the Network Access Server (NAS) interface. NAS interface uses Radius Authentication Dial In User Service (RADIUS) authentication for allocating the IP address (if needed) and RADIUS accounting for providing the IP address, International Mobile Subscriber Identity (IMSI) and Mobile Subscriber ISDN (MSISDN) to the SA node. The NAS can be for example a 3rd party GGSN that acts as a RADIUS client and a SA node that acts as a RADIUS server. The user plane traffic is carried in plain IP, Generic Routing Encapsulation (GRE) or IP-in-IP tunnels and the RADIUS signalling is used to set up the user plane traffic in a similar way as in the GPRS/3G networks. The NAS interface can be referred to as being the southbound Gi interface, as an alternative to the Gn interface.

During the Public Data Network (PDP) Context activation procedure, an "Accounting-Request-START" message, including an Access Point Name (APN), is sent from GGSN towards the SA node to inform it about the subscriber identification (IMSI, MSISDN) so that user profile can be determined. Upon receiving of the message a NAS context is established. Thus, the START message is used to inform SA node about new sessions, so that SA node can monitor them properly. An "Accounting-Request-STOP" message can be used by GGSN to inform the SA node about a possible PDP Context termination, thus SA has to delete the already established NAS Context.

RADIUS Accounting-Request-Start and Stop messages may be used during both primary and secondary PDP context activation and deactivation procedures, respectively. If the SA node is used for IP address assignment, then, upon reception of a RADIUS "Accounting-Request-STOP" message for all PDP Contexts associated to a session, the SA node (server) may make the associated IP address available for assignment.

In order to avoid race conditions, the GGSN shall include a 3GPP Vendor-Specific sub-attribute Session Stop indicator when it sends the "Accounting-Request STOP" for the last PDP context of a PDP session and the PDP session is terminated (i.e. the IP address and all GTP tunnels can be released). The SA server shall not assume the PDP session terminated until an "Accounting-Request STOP" with the Session Stop Indicator is received. In 3GPP reference architecture, the SA function corresponds to Flow Based Charging (FBC), which is implemented in Release 6 TPF (Traffic Plane Function) and in Release 7 PCEF (Policy and Charging Enforcement Function). 3GPP does not define interface between GGSN and TPF/PCEF. SA function can be integrated as part of GGSN or it can be implemented separate node connected to GGSN via Gi interface defined in 3GPP specification 29.061, which corresponds to the NAS interface described above.

Even though 3GPP reference architecture does not specify details about the case where GGSN and TPF/PCEF are implemented as separate nodes, this alternative is often used in practice. For operators, this approach has the benefit that SA can be introduced without making changes to existing GGSN nodes.

However, there may be a need for a method of locating an NAS context, which improved performance; in particular, with respect to a more reliable or fail-proof locating of the NAS context in order to enable an improved release of the IP address and/or all GTP tunnels.

SUMMARY OF THE INVENTION

This need may be met by a method of locating NAS context, a program element, and a computer-readable medium according to the independent claims. Advantageous embodiments of the present invention are described by the dependent claims.

According to an exemplary aspect a method of locating NAS context relating to a network access server session in a communication network is provided, the method comprising receiving an Accounting Stop Request for a PDP context associated to a network access server session, comparing an Accounting Session ID implemented in the Accounting Stop Request with Accounting Session IDs associated with active network access server sessions, in case that no matching Accounting Session ID is found, determining whether a value of an identification parameter implemented in the received Accounting Stop Request matches a value of a corresponding identification parameter associated with an active network access server session, and locating a NAS context based on the result of matching identification parameters.

In particular, the Accounting Stop Request may be a RADIUS Accounting Stop Request. Furthermore, the Accounting Stop Request may be sent from a GGSN. The GGSN may operate according to the 3GPP protocol. In particular, the timer may be configurable by an operator, e.g. of the NAS. Furthermore, a method according to an exemplary aspect of the invention may be performed by a device, e.g. a network access server, which is adapted to perform the above mentioned method. Such a device may also be part of the present invention.

In particular, the Accounting Stop Request may be received by a network access server, which may also be used to perform the method. Furthermore, in case a matching identification parameter is found the related NAS context of the associated network access server session may be identified as the NAS context to be located. The locating of the NAS context may be in particular an identifying of the respective NAS context. In particular, the network access server may search several or all of its active network access server sessions and compare several or all of the respective identification parameters which may be useful or suitable to identify that network access server sessions which is addressed by the Accounting Stop Request.

According to an exemplary aspect of the invention a program element is provided, which, when being executed by a processor, is adapted to control or carry out a method according to an exemplary aspect of the invention.

According to an exemplary aspect of the invention a computer-readable medium is provided, in which a computer program is stored which, when being executed by a processor, is adapted to control or carry out a method according to an exemplary aspect of the invention.

The term "network access server session" may particularly denote a session for which a "network access server (NAS)

context" may be established when an Accounting-Request-Start or accounting start request is sent from a gateway, e.g. a GGSN toward a service aware (SA) node to inform the SA node about subscriber identification (IMSI, MSISDN) so that a user profile may be determined. However, a new NAS context may not always be created when Accounting-Request-Start is received. A new NAS context may only be created if Accounting-Request-Start is about a new PDP session, i.e. received tuple (IMSI, MSISDN, IP address, APN) is unique. If Accounting-Request-Start is about existing PDP session and thus related to some existing NAS context in SA node, then the Accounting Session ID may be recorded to this NAS context (if Accounting Session ID is received in the message). In general there may be a one-to-one relation between PDP session and NAS context, i.e. NAS context can be single primary PDP context or NAS context is a set of secondary PDP contexts belonging to the same PDP session. When PDP session contains more than one PDP context, all those PDP contexts may be called secondary PDP contexts and if PDP session contains one PDP context, this PDP context may be called primary PDP context.

That is, a NAS context may be established at the beginning of a new session, service or communication relating to a new PDP session and may be used in order to identify the specific PDP session.

By providing a method according to an exemplary aspect of the invention it may be possible to ensure that, in case an SA does receive an Accounting-Request-Stop message relating to an Accounting-Request-Start message which was never received or processed by that node, no data packets are wrongly dropped. For example, GGSN may be compliant with 3GPP Specs and there is some remaining PDP contexts in the PDP session that SA node is not aware.

That is, by comparing values of identification parameters it may be possible to determine the network access server session the received Accounting Stop Request corresponds to even in cases when the Accounting Session ID is not known to the side receiving the Accounting Stop Request, e.g. a network access server. That may be the case when the receiving side did not receive or did not process an initially transmitted accounting start request, into which usually the Accounting Session ID is implemented. The result of this determining or checking may indicate whether an existing network access server context is found or not. In particular, it may be possible to avoid that a Service Aware (SA) node may start dropping all the user plane packets related to remaining PDP context(s) in the sending GGSN and may ignore accounting stop/interim messages related to those PDP(s).

A gist of an exemplary aspect of the invention may be that in case no Accounting Session ID is implemented in an Accounting Stop Request received by a network access server or no matching Accounting Session ID is found in the network access server, the network access server searches other identification parameters which may be used in order to verify the NAS context or PDP context the respective Accounting Stop Request belongs to. In particular, the network access server may perform a search for a matching NAS context involving several or all NAS contexts active on that network access server. Thus, even in cases that no Accounting Session ID is sent it may be possible to determine or locate the corresponding NAS context on the network access server so that the respective NAS context may be deactivated to enable a release of the respective resource in appropriate cases.

Next, further exemplary embodiments of the method are described. However, these embodiments also apply to the, the program element, and the computer-readable medium.

According to another exemplary embodiment of the method the identification parameter is one of the group consisting of: an IP address, an Access Point Name, an International Mobile Subscriber Identity, and Mobile Subscriber ISDN (MSISDN). All these parameters may be suitable parameters in order to locate or identify NAS context relating or associated with the received Accounting-Request-Stop message.

According to another exemplary embodiment of the method the located NAS context corresponds to the NAS context having a related network access server session to which a matching value of an identification parameter is associated.

According to another exemplary embodiment of the method the located NAS context in case it is determined that a Session Stop Indicator is included in the Accounting Stop Request.

By deactivating the located NAS context the related network access server session may also be deactivated. Thus, the respective resource may be released.

According to another exemplary embodiment of the method the Accounting Stop Request is ignored in case it is determined that a Session Stop Indicator is not included in the Accounting Stop Request.

According to another exemplary embodiment the method further comprises, in case that a matching Accounting Session ID is found, deciding whether a Session Stop Indicator is included in the Accounting Stop Request, in case no Session Stop Indicator is included deciding whether further PDP contexts are associated with the network access server session, and in case no further PDP context is associated with the network access server session, starting an IDLE Timer to determine a point in time for releasing the communication resources.

The term "communication resource" may particularly denote or relate to an IP address, an International Mobile Subscriber Identity, or a Mobile Subscriber ISDN, for example, which may be allocated to a specific communication in case a request for a communication or data transfer is sent, e.g. by using so-called RADIUS authentication and/or RADIUS accounting.

By providing a method according to this exemplary embodiment it may be possible to ensure that resources are released earlier than in the case of known methods. In particular, the method may provide a procedure to handle cases in which no Session Stop Indicators or Session Stop Indicator attributes are sent together with the Accounting Stop Request. This may in particular happen, in cases where the GGSN, which sends the Accounting Stop Request, is not compliant with latest 3GPP Specs where usage of Session Stop Indicator attribute is defined. In other words, in these cases a Session Stop Indicator attribute may not sent even if an "Accounting Request STOP" message, e.g. a RADIUS Accounting Stop Request, is about the last PDP context of the PDP session. In such faulty cases, according to the known procedures, NAS context may not be released—if one follows pedantically 3GPP specifications—and thus resources are wasted. This wasting of resources may be reduced when using a method according to an exemplary aspect of the invention.

Although, problems arising from the use of GGSN which are not compliant with the 3GPP specification, could be fixed at the GGSN and not at the receiving side, e.g. a receiver of a RADIUS requests, it may be advantageous to take care of at least some of the problems at the receiving side, since this may improve the flexibility of the used GGSN node. For example, it may not be necessary to make any changes to legacy GGSN and/or it may be possible to send Session Stop Indicator only if a certain (RADIUS) accounting mode is selected, and this (RADIUS) accounting mode cannot be enabled unless operator has bought the related software sales item.

According to another exemplary embodiment of the method the determination of the point in time is based on a predetermined time interval, wherein the predetermined time interval is measured from the starting of the IDLE Timer. In particular, the predetermined time interval may be in the range of a few minutes, e.g. the time interval may be less than 15 minutes or less than 10 minutes or less than 5 minutes.

Furthermore, it should be noted that the IDLE Timer according to this exemplary embodiments of the invention is not the same idle timer, which may be used in general to terminate idle bearer sessions in GGSN or SA node according to commonly known methods. Typical value for general idle timer can be several hours, while the IDLE Timer used in exemplary embodiments of this invention would typically have configured value as only a few minutes. If user plane traffic is detected before IDLE Timer expires then SA node knows that there is active (but yet unknown) PDP context related to NAS context and it may start using general idle timer to detect inactivity in the NAS context. Thus, the IDLE Timer according to exemplary embodiments of the invention may be formed as an additionally IDLE Timer which may precede the commonly known idle timer.

Even if usage of IDLE timer may mean that detection of the terminated PDP session may happen later than it actually occurred, the SA node may use the correct termination time when it is informing other nodes about the terminated NAS context. Event-Timestamp attribute may be used in RADIUS and Diameter requests originated from the SA node to indicate the right time when the NAS context was terminated and Change Time information element in CDR may be used for same purpose in offline charging interface.

According to another exemplary embodiment the method further comprises, in case the IDLE Timer is started, checking whether further communication associated to the network access server session is performed in the communication network.

According to another exemplary embodiment the method further comprises, in case no further communication is performed till the determined point in time is reached, deactivating the network access server session. In particular, the deactivating may be performed by deactivating a NAS context which is associated with or established for the network access server session.

According to another exemplary embodiment the method further comprises removing the Accounting Session ID from the network access server context associated with the network access server session, in case no Accounting Session ID is included. In particular, the Accounting Session ID may be included in the Accounting Stop Request and/or may be known to the receiving NAS.

Summarizing an exemplary aspect of the invention may be seen in providing a way to detect in TPF/PCEF (SA node) when PDP session has been terminated in GGSN. If Session Stop Indicator is included in RADIUS accounting STOP request, then SA node may know that PDP session is terminated in GGSN and the related NAS context may be terminated in SA node.

Furthermore, the SA node may keeps track of all the Accounting Session ID values related to NAS context, i.e. all the Accounting Session ID values of all PDP contexts of the related PDP session. When RADIUS accounting STOP request is received, SA node will remove the related Acct-Session-Id. If there are no Acct-Session-Ids linked to NAS context after this procedure, the SA nodes may start an IDLE Timer. If no user plane traffic is detected before IDLE Timer expiration, NAS context may be terminated. However, if user plane traffic is detected before IDLE Timer expires, then SA node may know that there are still active PDP contexts in the PDP session even though SA node does not know the related Acct-Session-Id.

Additionally, if SA node receives RADIUS INTERIM/STOP accounting request and Accounting Session ID cannot be associated with NAS context, then the SA node may analyze the IP address, IMSI, MSISDN and APN values in the RADIUS request. If matching NAS context can be found based on these values, then the received Accounting Session ID can be linked to the found NAS context and accounting request may be processed.

According to an additional exemplary aspect of the invention a method of indicating a free resource in a communication network is provided, wherein the method comprises implementing an Accounting Stop Request into a RADIUS Accounting Stop Request, and transmitting the Accounting Stop Request to a network access server of the communication network.

It has to be noted that embodiments and aspects of the invention have been described with reference to different subject-matters. In particular, some embodiments and aspects have been described with reference to apparatus type claims whereas other embodiments have been described with reference to method type claims. However, a person skilled in the art will gather from the above and the following description that, unless other notified, in addition to any combination of features belonging to one type of subject-matter also any combination between features relating to different subject-matters, in particular between features of the apparatus type claims and features of the method type claims is considered to be disclosed with this application.

The aspects and exemplary embodiments defined above and further aspects of the invention are apparent from the example of embodiment to be described hereinafter and are explained with reference to these examples of embodiment.

BRIEF DESCRIPTION OF THE DRAWINGS

FIG. 2 schematically illustrates a flowchart of a method according to an exemplary embodiment of the invention.

DETAILED DESCRIPTION

Figure 1:
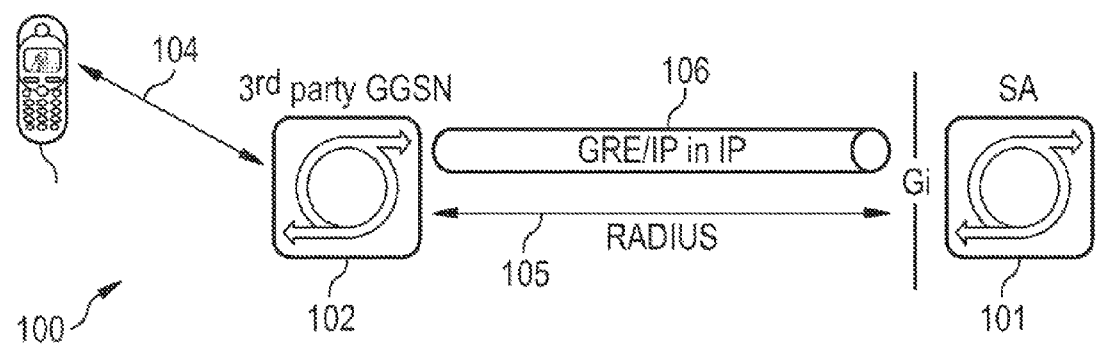
FIG. 1 schematically shows a SA node in Gi deployment.

The illustration in the drawing is schematic.
With reference to FIGS. 1 and 2 an embodiment of the present invention will be described in more detail.

As already mentioned above a Public Land Mobile Network (PLMN) 100 may comprise a Service Aware (SA) node 101, such as the so-called Flexi ISN, which can be deployed behind a Gateway GPRS Support Node (GGSN) 102, corresponding to a so-called Gi-deployment, to enable operators to offer services in a more flexible and efficient way. A mobile phone 103 may be used for transferring data or data packets in the PLMN network and may communicate with the GGSN which is indicated by arrow 104 in FIG. 1.

The communication between GGSN and SA node may be performed through the Network Access Server (NAS) interface. NAS interface uses Radius Authentication Dial In User Service (RADIUS) authentication for allocating the IP address (if needed) and RADIUS accounting for providing the IP address, International Mobile Subscriber Identity (IMSI) and Mobile Subscriber ISDN (MSISDN) to the SA node. That is, the GGSN 102 as well as the SA 101 may comprise an interface adapted to perform the necessary communication for a RADIUS service. In FIG. 1 the communication relating to the RADIUS service is indicated by the arrow 105. For example, the NAS interface can be formed a 3rd party GGSN that acts as a RADIUS client and a SA node that acts as a RADIUS server. The user plane traffic is carried in plain IP, Generic Routing Encapsulation (GRE) or IP-in-IP tunnels which is indicated schematically by the pipe 106 and the RADIUS signalling is used to set up the user plane traffic in a similar way as in the GPRS/3G networks. The NAS interface can be referred to as being the southbound Gi interface, as an alternative to the Gn interface.

FIG. 2 schematically illustrates a flowchart 200 of a method according to an exemplary embodiment of the invention.

When an "accounting request STOP" message is received 201, it is checked if the Accounting Session ID matches any of the Accounting Session ID of the NAS Contexts 202.

1. If a match is found 203 then:
It is checked whether a Session Stop Indicator attribute is included 204.
In case the Session Stop Indicator attribute is included 205 the NAS Context is deactivated 206. The deactivation may also inform external network nodes (Charging, RADIUS).
If the Session Stop Indicator attribute is not included 207 then it is further checked whether the Accounting Session ID is the last Accounting Session ID relating to the respective NAS session or NAS context 208.
If this is the last Accounting Session ID of the NAS Context 209 then it is removed from the NAS context and an operator configurable IDLE timer is started 210. After the IDLE timer expires and no user plane traffic is received for that NAS Context, the NAS context is disabled.
If this is not the last Accounting Session ID of the NAS context 211 then only the Accounting Session ID is removed from the NAS Context 212.

2. If a match is not found 213 then:
It is checked whether an existing NAS context is found with same Framed-IP-Address and/or same Called-Station-Id (APN) and/or same Calling-Station-Id (MSISDN), and/or 3GPP-IMSI 214.
In case such a matching is found, i.e. an active NAS context is found 215, it is checked whether a Session Stop Indicator attribute is included 216.
If such a Session Stop Indicator attribute is found 217 the NAS context is deactivated 218. The deactivation may also inform external network nodes (Charging, RADIUS).
If the Session Stop Indicator attribute is not included 219 the received RADIUS message is ignored and the NAS context is kept active 220.
If an existing NAS context is not found with same Framed-IP-Address and/or same Called-Station-Id (APN) and/or same Calling-Station-Id (MSISDN), and/or 3GPP-IMSI 221 the received RADIUS message is ignored 222.

It should be noted that the items stated under 1. may avoid any problems caused when GGSN fails to include session STOP indicator when it should be implemented, e.g. a RADIUS accounting STOP request, while the items stated under 2. may avoid dropping of data packets, since when using the respective method it may be possible that the SA node, e.g. a so-called Flexi node, is informed that secondary PDP contexts may exist in GGSN but not in the SA node.

Furthermore, it should be noted that IDLE timer defined here is not the same idle timer, which may be used in general to terminate idle bearer sessions in GGSN or SA node. Typical value for general idle timer can be several hours, while the IDLE timer used in this embodiment would typically have configured value as only a few minutes. If user plane traffic is detected before IDLE timer expires then SA node knows that there is active (but yet unknown) PDP context related to NAS context and it may start using general idle timer to detect inactivity in the NAS context. That is, the method according to an exemplary embodiment may comprise two different timers, which may operate in parallel or in series.

Even if usage of IDLE timer means that detection of the terminated PDP session may happen later than it actually occurred, the SA node will use the correct termination time when it is informing other nodes about the terminated NAS context. Event-Timestamp attribute can be used in RADIUS and Diameter requests originated from the SA node to indicate the right time when the NAS context was terminated and Change Time information element in CDR will be used for same purpose in offline charging interface.

Finally, it should be noted that the above-mentioned embodiments illustrate rather then limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

LIST OF REFERENCE SIGNS

100 PLMN
101 SA node
102 GGSN
103 Mobile phone
104 Arrow
105 Generic Routing Encapsulation
106 IP-in-IP tunnel
200 Flowchart
201 Accounting Request STOP
202 Acct. Session ID match?
203 Match found
204 Session Stop Indicator included?
205 Positive result
206 Deactivate NAS context
207 Negative result
208 Last Acct. Session ID?
209 Positive result
210 Remove Acct. Session ID and start IDLE Timer
211 Negative result
212 Remove Acct. Session ID
213 No match found
214 IP, APN, MSISDN, IMSI match?
215 Match found
216 Session Stop Indicator included?
217 Positive result
218 Deactivate NAS context 219 Negative result
220 Ignore message
221 Negative result
222 Ignore message

The invention claimed is:

1. A method of locating NAS context relating to a network access server session in a communication network, the method which comprises:
- receiving an Accounting Stop Request for a PDP context associated with a network access server session;
- comparing an Accounting Session ID implemented in the Accounting Stop Request with Accounting Session IDs associated with active network access server sessions;
- if no matching Accounting Session ID is found, determining whether a value of an identification parameter implemented in the received Accounting Stop Request matches a value of a corresponding identification parameter associated with an active network access server session; and
- locating a NAS context based on the result of matching identification parameters.

2. The method according to claim 1, wherein the identification parameter is selected from the group consisting of an IP address, an Access Point Name, an International Mobile Subscriber Identity, and a Mobile Subscriber ISDN.

3. The method according to claim 1, wherein the located NAS context corresponds to the NAS context having a related network access server session to which a matching value of an identification parameter is associated.

4. The method according to claim 3, which comprises deactivating the located NAS context if a determination is made that a Session Stop Indicator is included in the Accounting Stop Request.

5. The method according to claim 3, which further comprises ignoring the Accounting Stop Request if a determination is made that a Session Stop Indicator is not included in the Accounting Stop Request.

6. The method according to claim 1, which further comprises, if no matching value of identification parameters is found, ignoring the received Accounting Stop Request at a receiving side.

7. The method according claim 1, which further comprises:
- if a matching Accounting Session ID is found, deciding whether or not a Session Stop Indicator is included in the Accounting Stop Request;
- if no Session Stop Indicator is included, deciding whether or not further PDP contexts are associated with the network access server session; and
- if no further PDP context is associated with the network access server session, starting an IDLE Timer to determine a point in time for releasing the communication resources.

8. The method according to claim 7, which comprises:
- determining the point in time based on a predetermined time interval; and
- measuring the predetermined time interval from the starting of the IDLE Timer.

9. The method according to claim 7, which further comprises, if the IDLE Timer is started, checking whether or not further communication associated to the network access server session is performed in the communication network.

10. The method according to claim 9, which further comprises, if no further communication is performed until the determined point in time is reached, deactivating the network access server session.

11. The method according to claim 7, which further comprises removing the Accounting Session ID from the network access server context associated with the network access server session, in case no Accounting Session ID is included.

12. A non-transitory computer-readable medium, comprising computer-readable program code stored on the computer-readable medium which, when loaded into and executed by a processor, is configured to control or carry out the method according to claim 1.

* * * * *